US012759720B2

(12) United States Patent
Noel

(10) Patent No.: US 12,759,720 B2
(45) Date of Patent: Oct. 13, 2026

(54) ACOUSTIC PANEL FOR AN AIRCRAFT PROPULSION SYSTEM

(71) Applicant: Rohr, Inc., Chula Vista, CA (US)

(72) Inventor: Aaron T. Noel, Poway, CA (US)

(73) Assignee: Rohr, Inc., Chula Vista, CA (US)

( * ) Notice: Subject to any disclaimer, the term of this patent is extended or adjusted under 35 U.S.C. 154(b) by 357 days.

(21) Appl. No.: 18/532,606

(22) Filed: Dec. 7, 2023

(65) Prior Publication Data

US 2025/0187744 A1 Jun. 12, 2025

(51) Int. Cl.
*B64D 33/02* (2006.01)

(52) U.S. Cl.
CPC ...... *B64D 33/02* (2013.01); *B64D 2033/0206* (2013.01)

(58) Field of Classification Search
CPC .. B32B 3/12; B64D 2033/0206; B64D 33/02; F02K 1/827; F02C 7/24; F02C 7/045
See application file for complete search history.

(56) References Cited

U.S. PATENT DOCUMENTS

| | | | | |
|---|---|---|---|---|
| 4,034,135 | A * | 7/1977 | Passmore | E04C 2/423 428/184 |
| 5,028,474 | A * | 7/1991 | Czaplicki | B32B 27/06 428/184 |
| 6,274,216 | B1 * | 8/2001 | Gonidec | B32B 5/02 428/116 |
| 6,935,997 | B2 * | 8/2005 | Kling | G06T 17/20 493/356 |
| 7,762,938 | B2 * | 7/2010 | Gale | E04C 2/08 428/116 |
| 9,403,338 | B2 * | 8/2016 | Tuczek | E04C 2/326 |
| 10,309,305 | B2 * | 6/2019 | Biset | F02C 7/045 |
| 10,316,755 | B2 * | 6/2019 | Biset | F02C 7/24 |
| 10,436,118 | B2 * | 10/2019 | Weaver | F02C 7/045 |
| 10,525,636 | B2 | 1/2020 | Adams | |
| 11,014,331 | B2 * | 5/2021 | Gurvich | B32B 3/28 |
| 11,398,214 | B2 * | 7/2022 | Gurvich | B64D 33/02 |
| 11,686,247 | B2 | 6/2023 | Desjoyeaux | |

(Continued)

OTHER PUBLICATIONS

EP Search Report for EP Patent Application No. 24218213.7 dated Apr. 17, 2025.

*Primary Examiner* — Jeremy A Luks
(74) *Attorney, Agent, or Firm* — Getz Balich LLC

(57) ABSTRACT

An acoustic panel assembly includes an acoustic panel including an acoustic core arranged along a transverse direction and a longitudinal direction. The acoustic core extends between and to an inner core side and an outer core side. The acoustic core includes a plurality of cell rows distributed transversely. Each cell row of the plurality of cell rows includes a plurality of cells distributed longitudinally along the respective cell row of the plurality of cell rows. Each cell of the plurality of cells includes a first transverse panel, a second transverse panel, a first longitudinal panel, a second longitudinal panel, and an oblique panel extending between the inner core side and the outer core side. Each cell row of the plurality of cell rows includes a primary folded sheet and a secondary folded sheet. Each of the primary folded sheet and the secondary folded sheet forms the first transverse panel, the first longitudinal panel, and the second longitudinal panel for each cell of the plurality of cells.

17 Claims, 13 Drawing Sheets

(56) References Cited

U.S. PATENT DOCUMENTS

| | | | | |
|---|---|---|---|---|
| 2008/0020188 | A1* | 1/2008 | Gale | B31F 1/0009 428/174 |
| 2014/0349082 | A1 | 11/2014 | Tien | |
| 2020/0386187 | A1* | 12/2020 | Kelford | B32B 3/12 |
| 2022/0199062 | A1* | 6/2022 | Quesada | B32B 3/28 |
| 2023/0079348 | A1 | 3/2023 | Alonso-Miralles | |
| 2023/0211890 | A1 | 7/2023 | Aryafar | |
| 2025/0214712 | A1* | 7/2025 | Noel | F02K 1/827 |
| 2025/0214713 | A1* | 7/2025 | Noel | F02C 7/045 |

* cited by examiner

ACOUSTIC PANEL FOR AN AIRCRAFT PROPULSION SYSTEM

BACKGROUND

1. Technical Field

This disclosure relates generally to exhaust sections for aircraft propulsion systems, and more particularly to acoustic panels for aircraft propulsion system exhaust sections.

2. Background Information

Exhaust assemblies for aircraft propulsion systems may include acoustic panels configured for attenuating acoustic energy. Various configurations of acoustic panels are known in the art. While these known configurations have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an acoustic panel assembly for an aircraft propulsion system includes an acoustic panel including an acoustic core arranged along a transverse direction and a longitudinal direction. The acoustic core extends between and to an inner core side and an outer core side. The acoustic core includes a plurality of cell rows distributed transversely along the acoustic core. Each cell row of the plurality of cell rows includes a plurality of cells distributed longitudinally along the respective cell row of the plurality of cell rows. Each cell of the plurality of cells includes a first transverse panel, a second transverse panel, a first longitudinal panel, a second longitudinal panel, and an oblique panel extending between the inner core side and the outer core side. The first longitudinal panel and the second longitudinal panel extend between and to the first transverse panel and the second transverse panel. The oblique panel extends between and to the first transverse panel at the outer core side and the second transverse panel at the inner core side. Each cell row of the plurality of cell rows includes a primary folded sheet and a secondary folded sheet. Each of the primary folded sheet and the secondary folded sheet forms the first transverse panel, the first longitudinal panel, and the second longitudinal panel for each cell of the plurality of cells.

In any of the aspects or embodiments described above and herein, the primary folded sheet may include, for each cell of the plurality of cells, a primary transverse panel portion, a primary first longitudinal panel portion, a primary secondary longitudinal panel portion, and the oblique panel.

In any of the aspects or embodiments described above and herein, the secondary folded sheet may include, for each cell of the plurality of cells, a secondary transverse panel portion disposed at the primary transverse panel portion to form the first transverse panel, a secondary first longitudinal panel portion disposed at the primary first longitudinal panel portion to form the first longitudinal panel, and a secondary second longitudinal panel portion disposed at the primary second longitudinal panel portion to form the second longitudinal panel.

In any of the aspects or embodiments described above and herein, the primary transverse panel portion may have a first width in the longitudinal direction, the secondary transverse panel portion may have a second width in the longitudinal direction, the oblique panel may have a third width in the longitudinal direction at the inner core side, and the second width may be greater than the first width and the third width may be greater than the second width.

In any of the aspects or embodiments described above and herein, for each cell of the plurality of cells, the primary first longitudinal panel portion may be attached to the secondary first longitudinal panel portion at one or more first weld points and the primary second longitudinal panel portion may be attached to the secondary second longitudinal panel portion at one or more second weld points.

In any of the aspects or embodiments described above and herein, the primary folded sheet may further include, for each cell of the plurality of cells, a first attachment tab at the primary first longitudinal panel portion and a second attachment tab at the primary second longitudinal panel portion. Each of the first attachment tab and the second attachment tab may be attached to an adjacent cell row of the plurality of cell rows.

In any of the aspects or embodiments described above and herein, each of the first attachment tab and the second attachment tab has a tang length, and the tang length is greater than 0.25 inches.

In any of the aspects or embodiments described above and herein, for each cell of the plurality of cells, the oblique panel may form and separate an inner cavity and an outer cavity of each respective cell of the plurality of cells. The inner cavity may be disposed at the inner core side. The outer cavity may be disposed at the outer core side.

In any of the aspects or embodiments described above and herein, the inner cavity of a first cell of the plurality of cells of a first cell row of the plurality of cell rows may be connected in fluid communication with a second cell of the plurality of cells of a second cell row of the plurality of cell rows. The first cell row may be transversely adjacent the second cell row.

In any of the aspects or embodiments described above and herein, the first transverse panel may include a plurality of apertures. Each of the primary folded sheet and the secondary folded sheet may form the plurality of apertures.

According to another aspect of the present disclosure, a method for forming an acoustic panel assembly for an aircraft propulsion system includes forming a plurality of cell rows of an acoustic core by, for each cell row of the plurality of cell rows, folding and assembling a primary sheet and a secondary sheet to form each cell row with a plurality of cells. Each cell of the plurality of cells includes a first transverse panel, a first longitudinal panel, a second longitudinal panel, and an oblique panel extending between an inner core side of the acoustic core and an outer core side of the acoustic core. Each of the primary sheet and the secondary sheet forms the first transverse panel, the first longitudinal panel, and the second longitudinal panel. The first longitudinal panel and the second longitudinal panel extend transversely from the first transverse panel. The oblique panel extends transversely between and to the first transverse panel at the outer core side and the inner core side. The method further includes attaching each cell row of the plurality of cell rows to at least one other cell row of the plurality of cell rows to form the acoustic core.

In any of the aspects or embodiments described above and herein, forming the plurality of cell rows may include, for each cell of the plurality of cells, welding the primary sheet to the secondary sheet at the first longitudinal panel and the second longitudinal panel.

In any of the aspects or embodiments described above and herein, attaching each cell row of the plurality of cell rows to at least one other cell row of the plurality of cell rows may include welding each cell row of the plurality of cell rows to the at least one other cell row of the plurality of cell rows.

In any of the aspects or embodiments described above and herein, folding the primary folded sheet may form, for each cell of the plurality of cells, a primary transverse panel portion of the first transverse panel, a primary first longitudinal panel portion of the first longitudinal panel, a primary secondary longitudinal panel portion of the second longitudinal panel, and the oblique panel.

In any of the aspects or embodiments described above and herein, folding the secondary folded sheet may form, for each cell of the plurality of cells, a secondary transverse panel portion of the first transverse panel, a secondary first longitudinal panel portion of the first longitudinal panel, and a secondary second longitudinal panel portion of the second longitudinal panel.

According to another aspect of the present disclosure, an acoustic panel assembly for an aircraft propulsion system includes an inner skin and an acoustic panel. The inner skin extends circumferentially about an axial centerline. The inner skin extends between and to an inner skin side and an outer skin side. The inner skin includes a perforated skin portion. The acoustic panel includes an acoustic core disposed on the outer skin side at the perforated skin portion. The acoustic core is arranged along a transverse direction and a longitudinal direction. The acoustic core includes a plurality of cell rows distributed transversely along the acoustic core. Each cell row of the plurality of cell rows includes a plurality of cells distributed longitudinally along the respective cell row of the plurality of cell rows. Each cell of the plurality of cells includes a first transverse panel, a second transverse panel, a first longitudinal panel, and a second longitudinal panel, the first longitudinal panel and the second longitudinal panel extend between and to the first transverse panel and the second transverse panel. At least one cell row of the plurality of cell rows includes a primary folded sheet and a secondary folded sheet. The primary folded sheet includes, for each cell of the plurality of cells, a primary transverse panel portion, a primary first longitudinal panel portion, and a primary secondary longitudinal panel portion. The secondary folded sheet includes, for each cell of the plurality of cells, a secondary transverse panel portion disposed on the primary transverse panel portion to form the first transverse panel, a secondary first longitudinal panel portion disposed on the primary first longitudinal panel portion to form the first longitudinal panel, and a secondary second longitudinal panel portion disposed on the primary second longitudinal panel portion to form the second longitudinal panel.

In any of the aspects or embodiments described above and herein, the primary folded sheet may further include, for each cell of the plurality of cells, a first attachment tab at the primary first longitudinal panel portion and a second attachment tab at the primary second longitudinal panel portion. Each of the first attachment tab and the second attachment tab may be attached to an adjacent cell row of the plurality of cell rows.

In any of the aspects or embodiments described above and herein, each cell of the plurality of cells may have a cell width in the longitudinal direction. Each of the first attachment tab and the second attachment tab may have a tang length. The tang length may be greater than the width.

In any of the aspects or embodiments described above and herein, the primary folded sheet may further include, for each cell of the plurality of cells, an oblique panel extending transversely and radially between and to the first transverse panel and the second transverse panel. The oblique panel may form and separate an inner cavity and an outer cavity of each respective cell of the plurality of cells.

In any of the aspects or embodiments described above and herein, the inner cavity may be disposed at the perforated skin portion.

The present disclosure, and all its aspects, embodiments and advantages associated therewith will become more readily apparent in view of the detailed description provided below, including the accompanying drawings.

DETAILED DESCRIPTION

Figure 1:
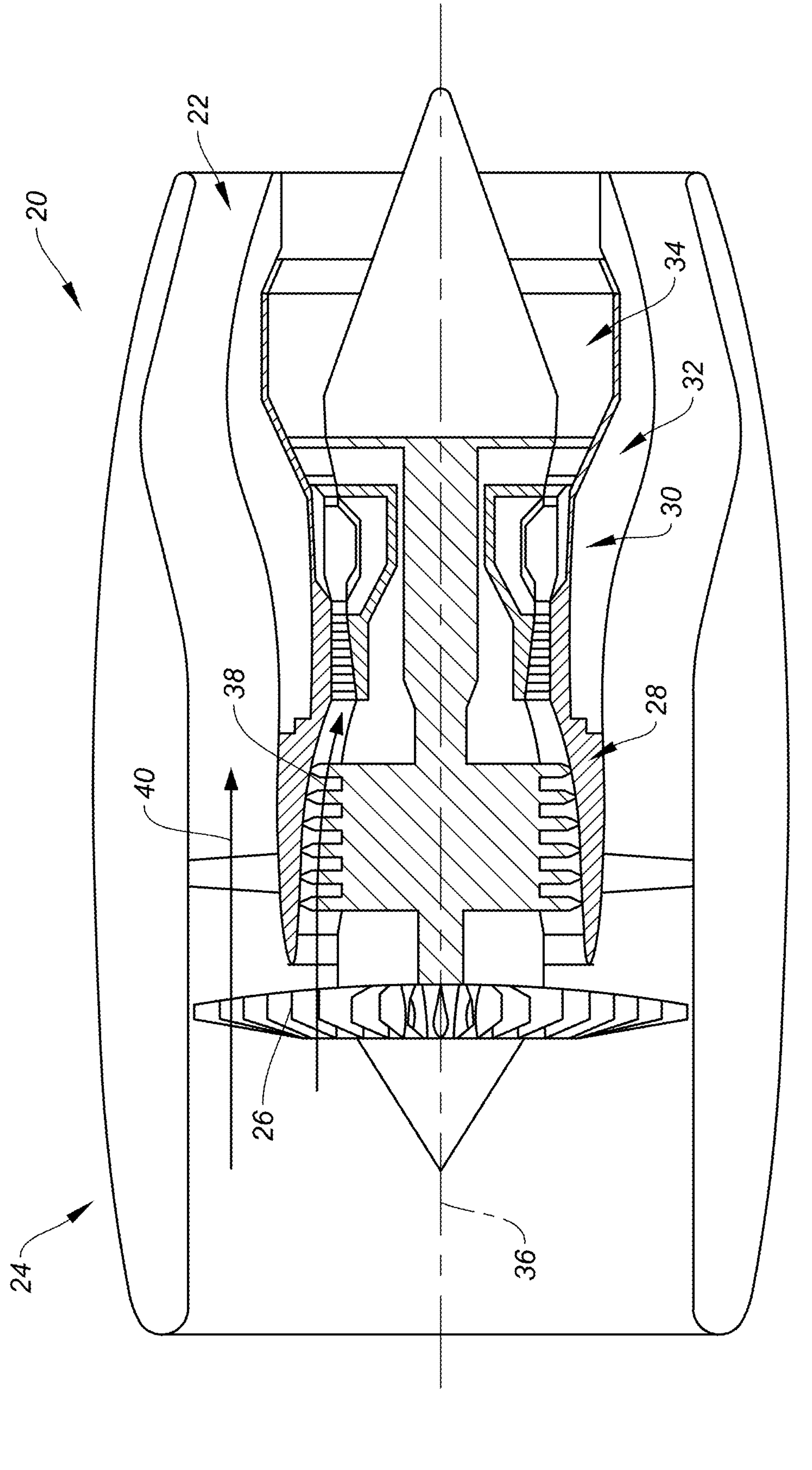
FIG. 1 schematically illustrates a cutaway, side view of an aircraft propulsion system including a gas turbine engine, in accordance with one or more embodiments of the present disclosure.

FIG. 1 illustrates a propulsion system 20 configured for an aircraft. The propulsion system 20 of FIG. 1 includes a gas turbine engine 22 and a nacelle 24. The gas turbine engine 22 of FIG. 1 is configured as a multi-spool turbofan gas turbine engine. However, while the following description and accompanying drawings may refer to the turbofan gas turbine engine 22 of FIG. 1 as an example, it should be understood that aspects of the present disclosure may be equally applicable to other configurations of gas turbine engines (e.g., a turboshaft gas turbine engine, a turboprop gas turbine engine, a turbojet gas turbine engine, a propfan gas turbine engine, an open rotor gas turbine engine, etc.).

The gas turbine engine 22 of FIG. 1 includes a fan 26, a compressor section 28, a combustor section 30, a turbine section 32, and an exhaust section 34 disposed along an axial centerline 36 (e.g., a rotational axis) of the propulsion system 20. In operation, the fan 26 draws and directs ambient air into the propulsion system 20. The air may be divided into a core flow path 38 and a bypass flow path 40. Each of the core flow path 38 and the bypass flow path 40 may be annular flow paths extending circumferentially about (e.g., completely around) the axial centerline 36. The core flow path 38 extends through the propulsion system 20. Air flow along the core flow path 38 is directed through the compressor section 28, the combustor section 30, the turbine section 32, and the exhaust section 34. The compressor section 28 increases the pressure of the air along the core flow path 38 and directs the air into the combustor section 30 where the air mixed with fuel and ignited. The combustion gas resulting from the combusted fuel and air mixture flows through the turbine section 32 causing one or more bladed turbine rotors to rotate and drive one or more rotors (e.g., bladed compressor rotors) of the compressor section 28 and the fan 26 via one or more shafts. Exhaust gas exiting the turbine section 32 is directed out of the gas turbine engine 22 through the exhaust section 34. The bypass flow path 40 extends through the propulsion system 20 outside of the gas turbine engine 22. Air flow along the bypass flow path 40 may be directed through the propulsion system 20 by one or more bypass ducts formed between (e.g., radially between) the gas turbine engine 22 and the nacelle 24.

The nacelle 24 is configured to house and provide an aerodynamic cover for the propulsion system 20. The nacelle 24 extends axially along the axial centerline 36. The nacelle 24 extends circumferentially about (e.g., completely around) the axial centerline 36.

Figure 2:
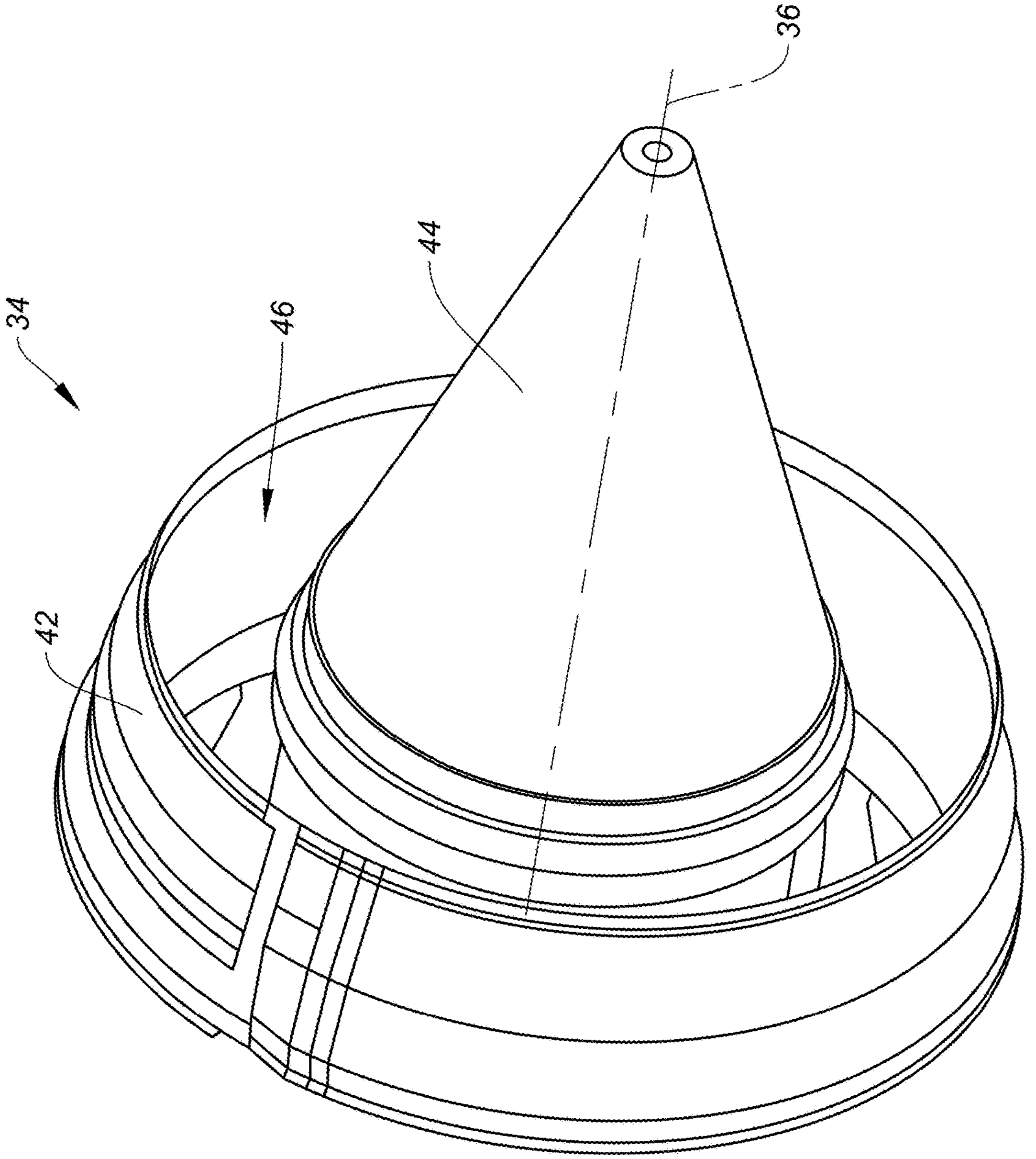
FIG. 2 illustrates a perspective view of a portion of an exhaust section for an aircraft propulsion system, in accordance with one or more embodiments of the present disclosure.

FIG. 2 illustrates a portion of the exhaust section 34. The exhaust section 34 of FIG. 2 includes an exhaust nozzle 42 and an exhaust centerbody 44 extending along the axial centerline 36. Components of the exhaust section 34 are described herein with respect to the axial centerline 36, however, it should be understood that one or more components of the exhaust section 34 may be configured with respective axial centerlines which are offset from or otherwise different than the axial centerline 36. The exhaust nozzle 42 extends circumferentially about (e.g., completely around) the exhaust centerbody 44 and the axial centerline 36. The exhaust nozzle 42 is radially spaced from the exhaust centerbody 44 to form an exhaust annulus 46 through which combustion exhaust gas from the core flow path 38 (see FIG. 1) may exit the exhaust section 34 (e.g., to generate forward thrust for the propulsion system 20).

Figure 3:
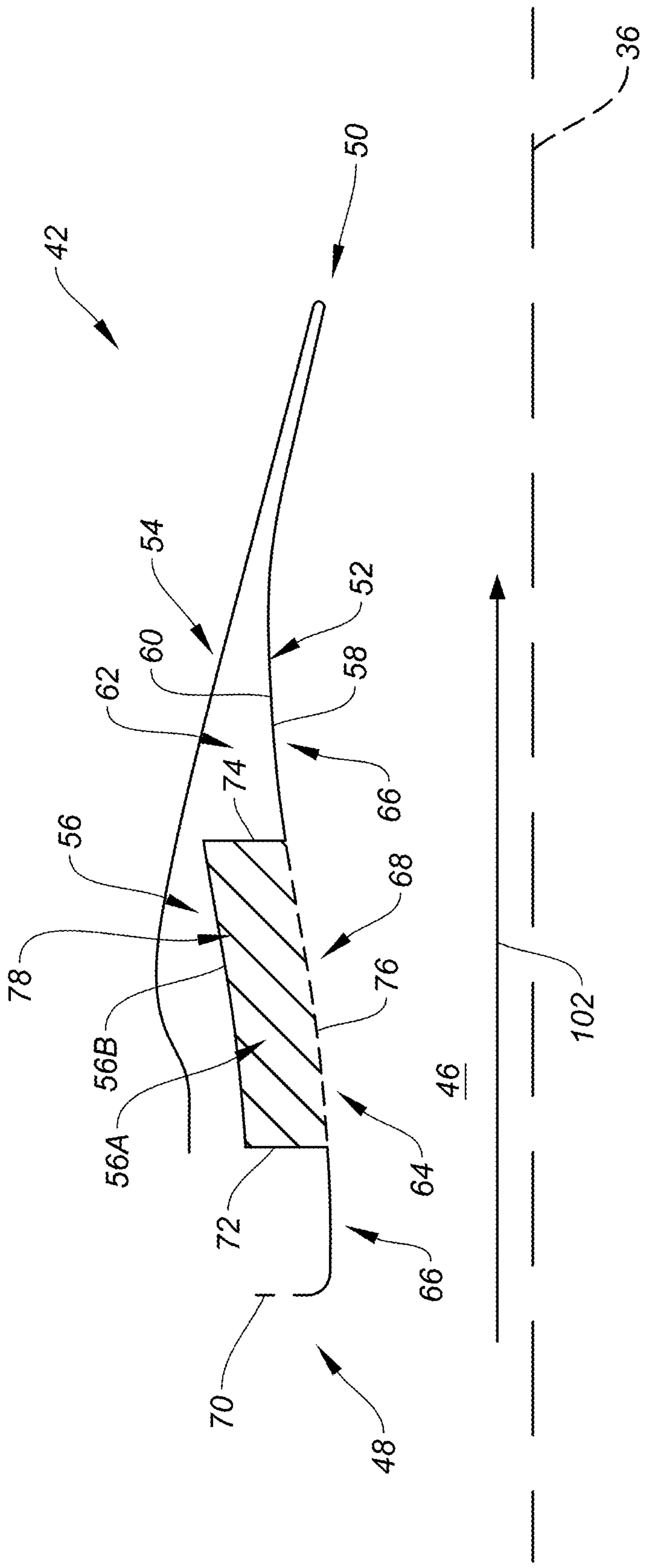
FIG. 3 illustrates a cutaway, side view of an exhaust nozzle of the exhaust section of FIG. 2 including an acoustic panel, in accordance with one or more embodiments of the present disclosure.

FIG. 3 illustrates a cutaway, side view of the exhaust nozzle 42. The exhaust nozzle 42 extends (e.g., axially extends) between and to a first axial end 48 (e.g., a forward axial end) of the exhaust nozzle 42 and a second axial end 50 (e.g., an aft axial end) of the exhaust nozzle 42. The exhaust nozzle 42 of FIG. 3 includes an inner skin 52 (e.g., an inner radial skin), an outer skin 54 (e.g., an outer radial skin), and an acoustic panel 56. While the acoustic panel 56 of the present disclosure will be described with respect to the exhaust nozzle 42, it should be understood that aspects of the present disclosure acoustic panel 56 may be equally applicable to other aircraft propulsion system structures such as, but not limited to, a nacelle inlet, a thrust reverser, etc.

The inner skin 52 extends between and to the first axial end 48 and the second axial end 50. The inner skin 52 extends between and to an inner side 58 of the inner skin 52 and an outer side 60 of the inner skin 52. The inner skin 52 extends circumferentially about (e.g., completely around) the axial centerline 36. The inner skin 52 (e.g., the inner side 58) forms a portion of the exhaust annulus 46 (see FIG. 2). The inner skin 52 (e.g., the outer side 60) forms a cavity 62 of the exhaust nozzle 42 between (e.g., radially between) the inner skin 52 and the outer skin 54. The inner skin 52 of FIG. 3 includes a first skin portion 64 and a second skin portion 66. The first skin portion 64 is a perforated skin portion. The first skin portion 64 includes a plurality of apertures 68 extending through the inner skin 52 from the inner side 58 to the outer side 60. The first skin portion 64 extends (e.g., axially extends) a portion of an axial distance between the first axial end 48 and the second axial end 50. The first skin portion 64 extends circumferentially along all or a substantial portion of the inner skin 52. The second skin portion 66 is disposed coincident with the first skin portion 64. The second skin portion 66 is an imperforate skin portion forming all or a substantial portion of the inner skin 52 outside of the first skin portion 64. As shown in FIG. 3, the inner skin 52 may have one or more curves (e.g., convex and/or concave curves) extending between the first axial end 48 and the second axial end 50. The inner skin 52 may include an attachment flange 70, for example, at (e.g., on, adjacent, or proximate) the first axial end 48 to facilitate attachment of the exhaust nozzle 42 to the gas turbine engine 22 (see FIG. 1).

The outer skin 54 extends (e.g., axially extends) from the second axial end 50 toward the first axial end 48. The outer skin 54 extends circumferentially about (e.g., completely around) the axial centerline 36. The outer skin 54 is mounted to or otherwise disposed at (e.g., on, adjacent, or proximate) the inner skin 52 at the second axial end 50. Portions of the outer skin 54 are spaced (e.g., radially spaced) from the inner skin 52 to further form the cavity 62 between (e.g., radially between) the inner skin 52 and the outer skin 54.

The acoustic panel 56 includes an acoustic core 56A and a back skin 56B. The acoustic core 56A is mounted to or otherwise disposed at (e.g., on, adjacent, or proximate) the inner skin 52 (e.g., the outer side 60) coincident with the first skin portion 64. The acoustic core 56A is disposed within the cavity 62. The acoustic core 56A extends (e.g., axially extends) between and to a first axial end 72 of the acoustic core 56A and a second axial end 74 of the acoustic core 56A. The acoustic core 56A extends between and to an inner side 76 (e.g., an inner radial side) of the acoustic core 56A and an outer side 78 (e.g., an outer radial side) of the acoustic core 56A. The acoustic core 56A extends circumferentially about (e.g., completely or in substantial part around) the axial centerline 36. As shown in FIG. 3, the acoustic core 56A may be disposed axially between the first axial end 48 and the second axial end 50 with the first axial end 72 axially spaced from the first axial end 48 and/or the second axial end 74 axially spaced from the second axial end 50. The outer side 78 may be spaced (e.g., radially spaced) from the outer skin 54. The present disclosure, however, is not limited to the foregoing exemplary configuration and position of the acoustic core relative to the inner skin 52 and the outer skin 54.

The back skin 56B is disposed at (e.g., on, adjacent, or proximate) the outer side 78. The back skin 56B extends circumferentially about (e.g., completely or in substantial part around) the axial centerline 36 coincident with the acoustic core 56A. The back skin 56B may be an imperforate skin circumscribing and enclosing internal cavities of the acoustic core 56A.

Figure 4:
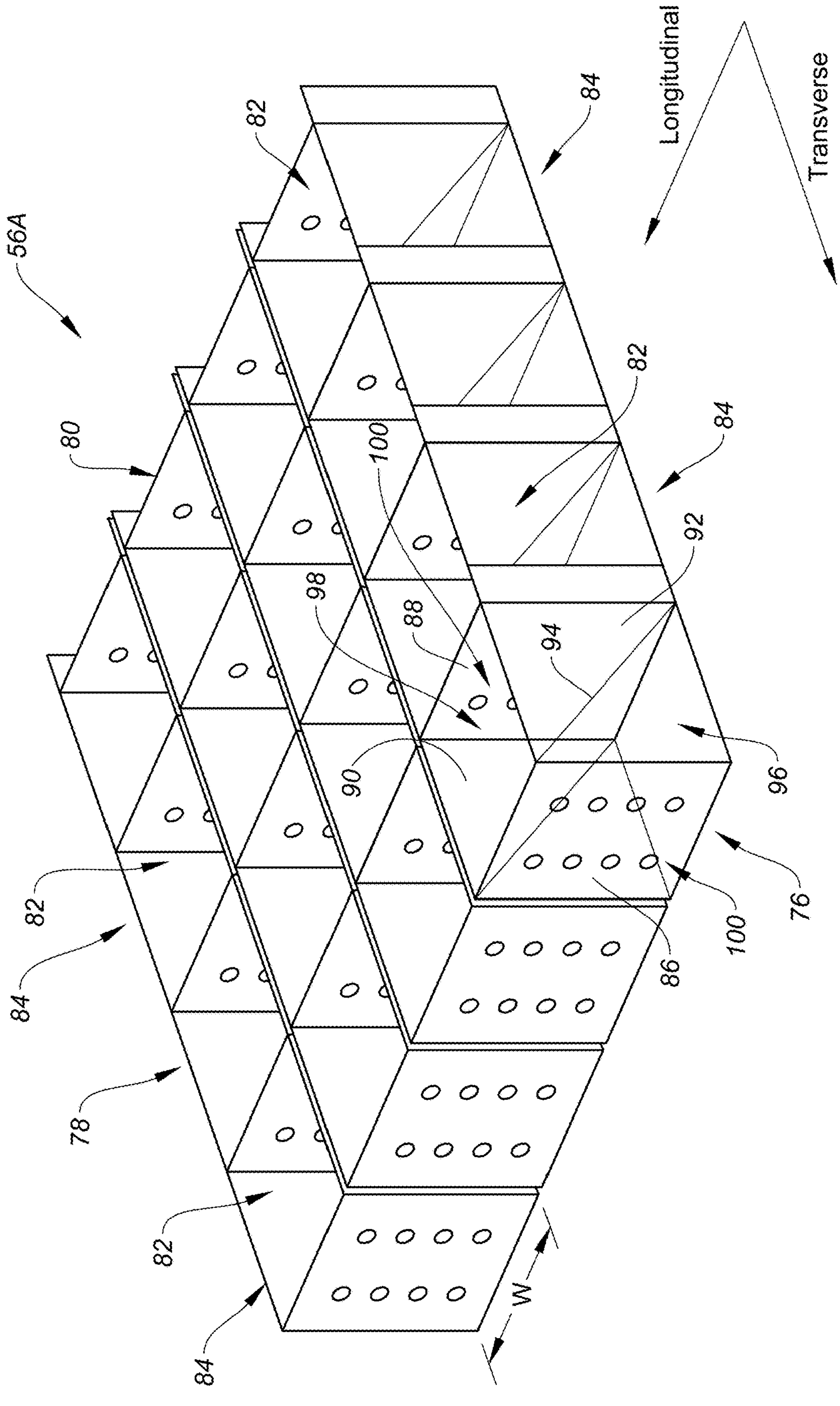
FIG. 4 illustrates a cutaway perspective view of a portion of an acoustic core of the acoustic panel of FIG. 3, in accordance with one or more embodiments of the present disclosure.
Figure 5:
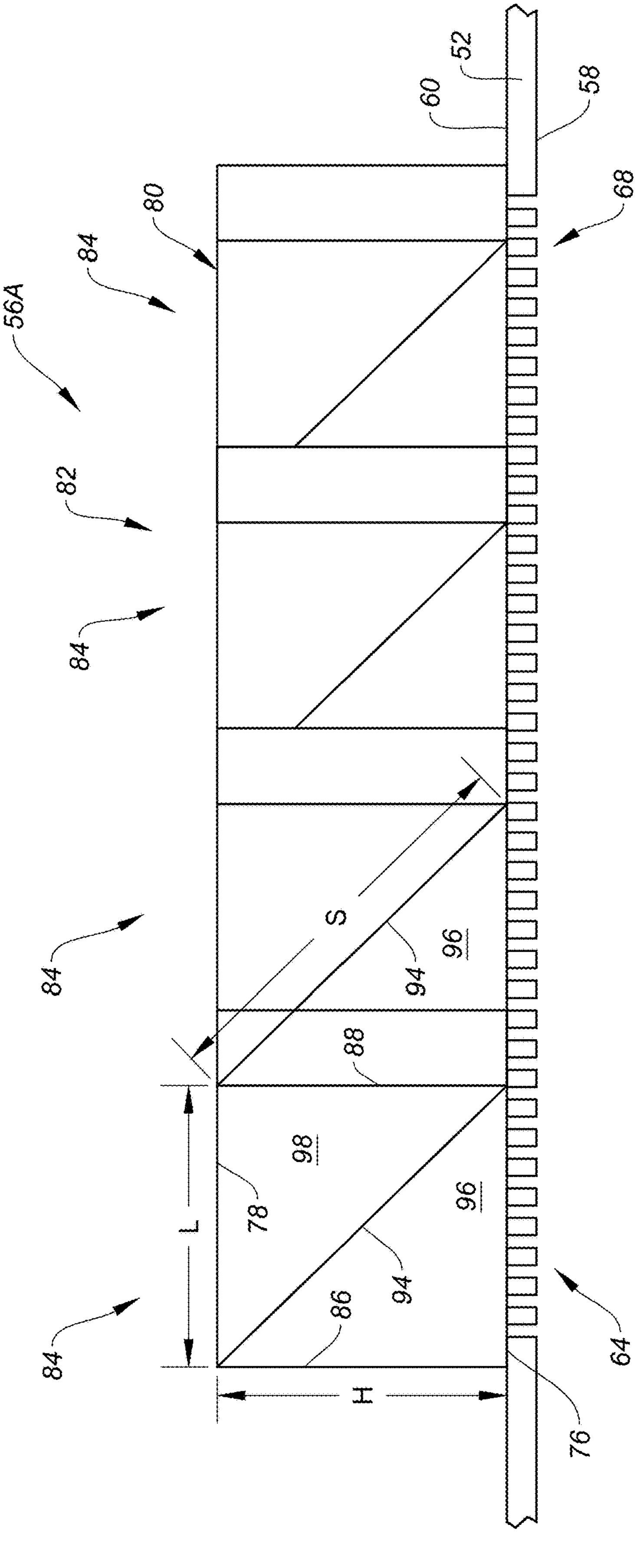
FIG. 5 illustrates cutaway, side view of a portion of the exhaust nozzle and the acoustic core of FIG. 3, in accordance with one or more embodiments of the present disclosure.
Figure 6A:
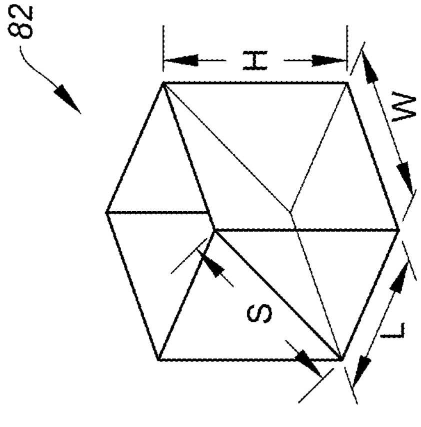
FIGS. 6A-F illustrates a cutaway, perspective views of exemplary cells for an acoustic core, in accordance with one or more embodiments of the present disclosure.
Figure 6B:
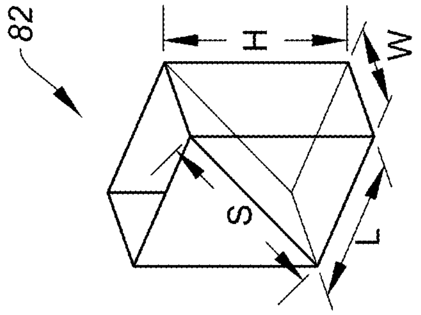
Figure 6C:
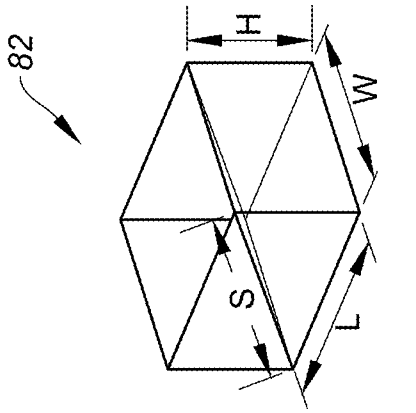
Figure 6D:
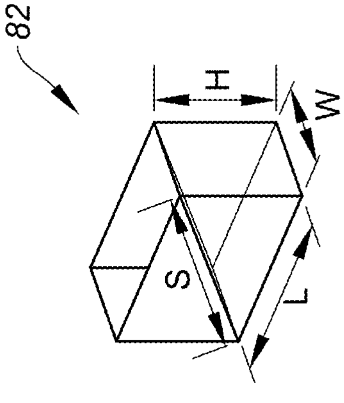
Figure 6E:
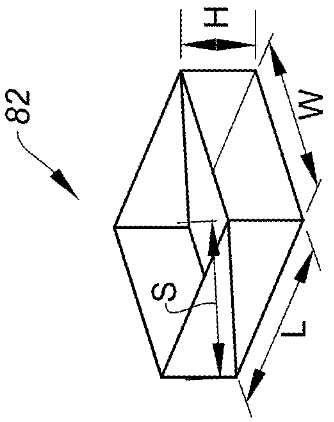
Figure 6F:
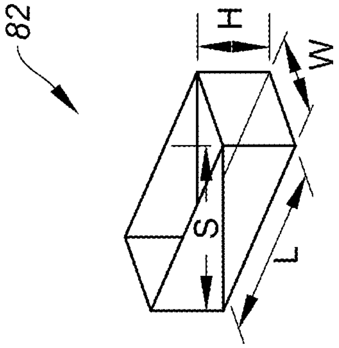

FIG. 4 illustrates a cutaway, perspective view of a portion of the acoustic core 56A. FIG. 5 illustrates a cutaway, side view of the acoustic core 56A. The acoustic core 56A, as shown in FIG. 4, is arranged along a transverse direction and a longitudinal direction. The acoustic core 56A includes a plurality of cell walls 80 forming a plurality of cells 82 of the acoustic core 56A. The cells 82 may be arranged and distributed longitudinally in cell rows 84, as will be discussed in further detail. The cell rows 84 may be arranged and distributed transversely to form the acoustic core 56A. The portion of the acoustic core 56A of FIG. 4, for example, includes four cell rows 84, with each of the cell rows 84 disposed at (e.g., on, adjacent, or proximate) one or two adjacent others of the cell rows 84.

For each of the cells 82, the cell walls 80 form a first transverse panel 86, a second transverse panel 88, a first longitudinal panel 90, a second longitudinal panel 92, and an oblique panel 94. The first transverse panel 86, the second transverse panel 88, the first longitudinal panel 90, the second longitudinal panel 92, and the oblique panel 94 form an inner cell cavity 96 and an outer cell cavity 98 for each of the cells 82. The inner cell cavity 96 and the outer cell cavity 98 are connected in fluid communication with the apertures 68 of the first skin portion 64. Each of the first transverse panel 86, the second transverse panel 88, the first longitudinal panel 90, the second longitudinal panel 92, and the oblique panel 94 extends between and to or substantially between and to the inner side 76 and the outer side 78. Each of the first transverse panel 86, the second transverse panel 88, the first longitudinal panel 90, the second longitudinal panel 92, and the oblique panel 94 has a height H of the cells 82 from the inner side 76 to the outer side 78, for example, in the radial direction (see FIG. 3).

Each of the first transverse panel 86 and the second transverse panel 88 includes one or more apertures 100. The present disclosure is not limited to any particular quantity, size, or shape of the apertures 100. The first transverse panel 86 forms the inner cell cavity 96. The apertures 100 of the first transverse panel 86 coincide with (e.g., connected in fluid communication with) the inner cell cavity 96. The second transverse panel 88 forms the outer cell cavity 98. The apertures 100 of the second transverse panel 88 coincide with (e.g., are connected in fluid communication with) the outer cell cavity 98. For each of the cells 82, the first transverse panel 86 is spaced from the second transverse panel 88 by a length L of the cells 82 in the transverse direction. As can be understood from FIGS. 4 and 5, the first transverse panel 86 for one of the cells 82 may be the second transverse panel 88 for a transversely-adjacent one of the cells 82. Similarly, the second transverse panel 88 for one of the cells 82 may be the first transverse panel 86 for a transversely-adjacent one of the cells 82.

The first longitudinal panel 90 and the second longitudinal panel 92 extend (e.g., transversely extend) between and to the first transverse panel 86 and the second transverse panel 88. Each of the first longitudinal panel 90 and the second longitudinal panel 92 form the inner cell cavity 96 and the outer cell cavity 98. As shown in FIG. 4, for example, each of the first longitudinal panel 90 and the second longitudinal panel 92 may be an imperforate panel. The present disclosure, however, is not limited to this exemplary configuration of the first longitudinal panel 90 and the second longitudinal panel 92. For each of the cells 82, the first longitudinal panel 90 is spaced from the second longitudinal panel 92 by a width W of the cells 82 in the longitudinal direction. As will be discussed in further detail, each of the first longitudinal panel 90 and the second longitudinal panel 92 may be formed by one or more layers of the cell walls 80.

The oblique panel 94 extends (e.g., longitudinally extends) between and to the first longitudinal panel 90 and the second longitudinal panel 92. The oblique panel 94 extends (e.g., radially and transversely extends) between and to the first transverse panel 86 at (e.g., on, adjacent, or proximate) the outer side 78 and the second transverse panel 88 at (e.g., on, adjacent, or proximate) the inner side 76. The oblique panel 94 separates the inner cell cavity 96 from the outer cell cavity 98. As shown in FIG. 4, for example, the oblique panel 94 may be an imperforate panel. As shown in FIG. 5, the oblique panel 94 has a slant distance S extending (e.g., radially and transversely extending) between and to the first transverse panel 86 and the second transverse panel 88. The slant distance S may be characterized as a function of the height H and the length L, for example, by the following equation [1]:

$$S = \sqrt{L^2 + H^2} \qquad [1]$$

The height H, the length L, the width W, and the slant distance S for each of the cells 82 may be selected to tune the acoustic core 56A for attenuation of different acoustic frequencies. The present disclosure is not limited to any particular values of the height H, the length L, the width W, or the slant distance S for the cells 82. As shown in FIGS. 6A-6F, for example, the cells 82 may be configured with a variety of different values of the height H, the length L, the width W, or the slant distance S to facilitate attenuation of one or more target acoustic frequency ranges.

Referring to FIGS. 1-5, during operation of the propulsion system 20, exhaust airflow 102 (see FIG. 3) through the exhaust annulus 46 flows across the apertures 68 of the first skin portion 64 of the inner skin 52. The cells 82 of the acoustic core 56A (e.g., the inner cell cavity 96 and the outer cell cavity 98) form resonant cavities (e.g., Helmholtz resonant cavities) that contribute to the dissipation of incident acoustic energy in proximity to the exhaust nozzle 42 by attenuating acoustic reflected waves and/or by converting acoustic energy into heat energy (e.g., by Helmholtz resonance).

Dimensions of the cells 82 of the acoustic core 56A, including the height H, the width W, the length L, and the slant distance S, may be selected to address a number of different acoustic panel 56 objectives such as, but not limited to, targeted acoustic frequency attenuation, ease of manufacture, and acoustic panel 56 resistance to thermal stress during operation of an associated gas turbine engine or other machinery. Thermal stress experienced by an acoustic panel, such as the acoustic panel 56, may be addressed or otherwise mitigated, at least in part, by limiting a temperature differential across the inner skin and the acoustic panel (e.g., the acoustic core 56A and the back skin 56B). For example, by increasing a density of the acoustic core, a temperature conductivity of the acoustic core may be similarly increased, thereby reducing the temperature differential across the inner skin and the acoustic panel. In practice, these different acoustic panel objectives may be in competition. For example, a value of the cell length may be selected to attenuate a target acoustic frequency and a value of the cell width may be selected to facilitate ease of acoustic core assembly. For acoustic cores having cell widths less than about 0.5 inches, manufacture (e.g., assembly) of the acoustic cores may be increasingly difficult, time consuming, and expensive, for example, where the assembly process includes performing spot welding or attachment between adjacent cells. For an acoustic core having the aforementioned selected cell length and cell width, the acoustic core may not possess sufficient density (and hence thermal conductivity) to limit the differential temperature across the inner skin and the acoustic panel to suitable levels during operation.

Figure 7:
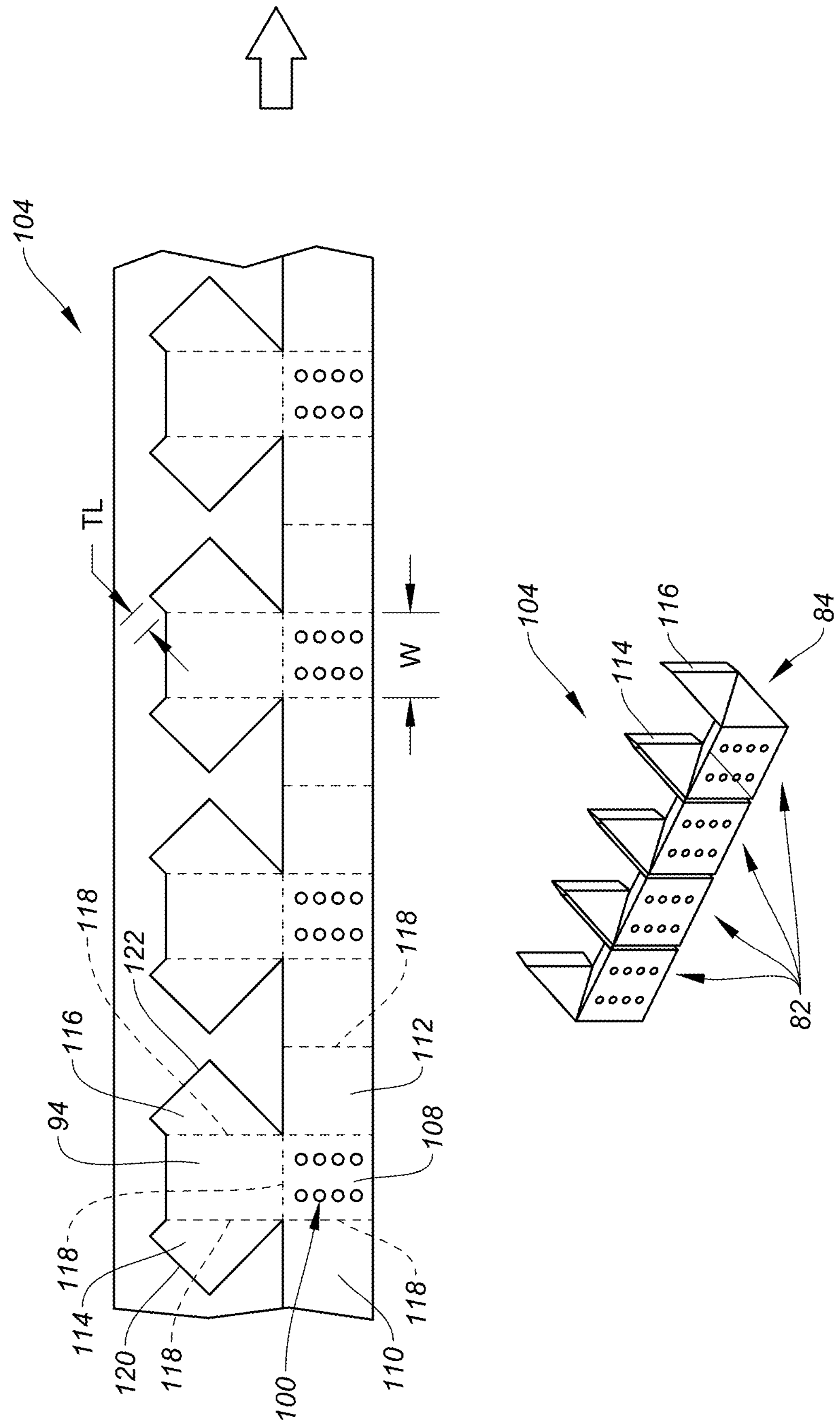
FIG. 7 illustrates a primary sheet for the acoustic core of FIG. 3, in accordance with one or more embodiments of the present disclosure.
Figure 8:
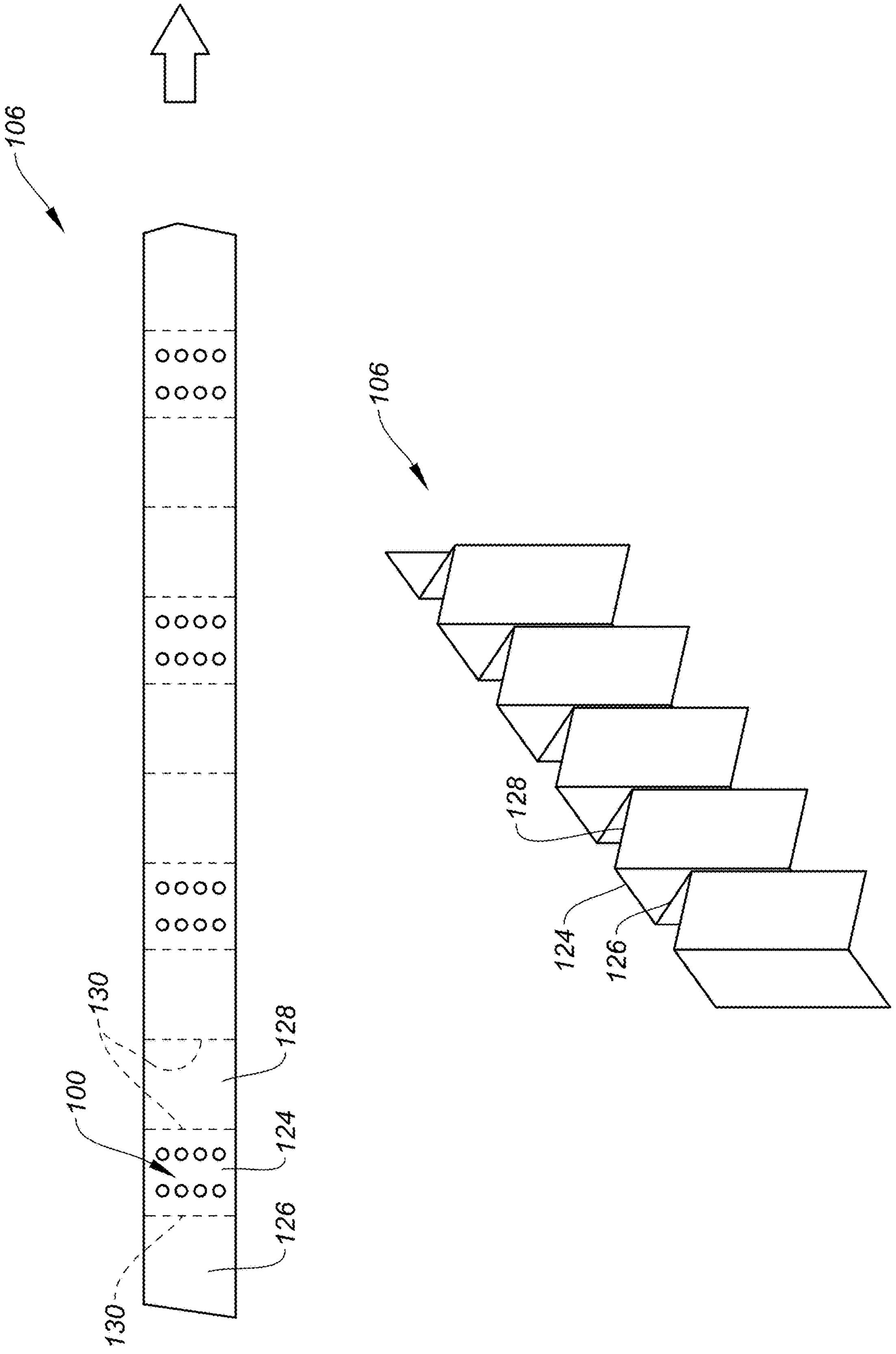
FIG. 8 illustrates a secondary sheet for the acoustic core of FIG. 3, in accordance with one or more embodiments of the present disclosure.

Referring to FIGS. 7 and 8, the cell walls 80 (e.g., a first transverse panel 86, a second transverse panel 88, a first longitudinal panel 90, a second longitudinal panel 92, and an oblique panel 94) of the of the acoustic core 56A are formed by at least one primary sheet 104 (e.g., a folded sheet) and at least one secondary sheet 106 (e.g., a folded sheet). The primary sheets 104 and the secondary sheets 106 may be alternatingly positioned (e.g., in the transverse direction) to form one, more than one, or each of the cell rows 84 of the acoustic core 56A.

FIG. 7 illustrates the primary sheet 104 in an unfolded condition and a folded condition. The primary sheet 104 forms at least a portion of one, more than one, or each of the cell rows 84 of the acoustic core 56A. The primary sheet 104, in its unfolded condition, may be a flat, continuous (e.g., single piece) panel (sometimes referred to as a "ribbon"). The primary sheet 104 may be cut to form a transverse panel portion 108, a first longitudinal panel portion 110, a second longitudinal panel portion 112, the oblique panel 94, a first attachment tab 114, and a second attachment tab 116 for one, more than one, or all of the cells 82 of one of the cell rows 84. The primary sheet 104 may additionally be cut to form the apertures 100 (e.g., through the transverse panel portion 108). The primary sheet 104 may be cut using any suitable cutting process for the primary sheet 104 material such as, but not limited to, a laser cutting process. The primary sheet 104 may be folded along fold lines 118 separating the transverse panel portion 108, the first longitudinal panel portion 110, the second longitudinal panel portion 112, the oblique panel 94, the first attachment tab 114, and the second attachment tab 116. The first attachment tab 114 and the second attachment tab 116 may extend from the oblique panel 94. The primary sheet 104 may be formed wholly or in substantial part by a panel material such as, but not limited to, a metal or a metal alloy material (e.g., an aluminum alloy, a titanium alloy, etc.).

The first attachment tab 114 and the second attachment tab 116 may be used to attach adjacent cell rows 84 together. For example, the first attachment tab 114 and the second attachment tab 116 may be welded (e.g., spot welded) to the first longitudinal panel 90 and the second longitudinal panel 92, respectively, for one of the cells 82 of an adjacent one of the cell rows 84. Each of the first attachment tab 114 and the second attachment tab 116 has a tang length TL. The tang length TL of the first attachment tab 114 extends (e.g., in the transverse direction) between and to the oblique panel 94 and a distal end 120 of the first attachment tab 114. Similarly, the tang length TL of the second attachment tab 116 extends (e.g., in the transverse direction) between and to the oblique panel 94 and a distal end 122 of the second attachment tab 116. For example, the tang length TL may extend between and to the oblique panel 94 and the respective distal end 120, 122 at (e.g., on, adjacent, or proximate) the inner side 76. A value of the tang length TL may be greater than about 0.25 inches, for example, to facilitate a sufficiently large contact area (e.g., weld surface) between the attachment tabs 114, 116 and the longitudinal panels 90, 92 of a respective one of the cells 82 of an adjacent cell row 84. A value of the tang length TL for the first attachment tab 114 and/or the second attachment tab 116 may be selected to facilitate the selection of the width W while maintaining the acoustic core 56A within a target density range. For example, by increasing the tang length TL for the first attachment tab 114 and/or the second attachment tab 116 (e.g., tang length TL greater than or equal to the width W), the width W may also be increased while maintaining the acoustic core 56A within a target density range. An increased width W for the cells 82 may facilitate improved assembly (e.g., welding) for the acoustic core 56A (e.g., the primary sheets 104 and the secondary sheets 106), as will be discussed in further detail.

FIG. 8 illustrates the secondary sheet 106 in an unfolded condition and a folded condition. The secondary sheet 106 forms at least a portion of one, more than one, or each of the cell rows 84 of the acoustic core 56A. The secondary sheet 106, in its unfolded condition, may be a flat, continuous (e.g., single piece) panel (sometimes referred to as a "ribbon"). The secondary sheet 106 may be cut to form a transverse panel portion 124, a first longitudinal panel portion 126, and a second longitudinal panel portion 128 for one, more than one, or all of the cells 82 of one of the cell rows 84. The secondary sheet 106 may additionally be cut to form the apertures 100 (e.g., through the transverse panel portion 124). The secondary sheet 106 may be cut using any suitable cutting process for the secondary sheet 106 material such as, but not limited to, a laser cutting process. The secondary sheet 106 may be folded along fold lines 130 separating the transverse panel portion 124, the first longitudinal panel portion 126, and the second longitudinal panel portion 128. The secondary sheet 106 may be formed wholly or in substantial part by a panel material such as, but not limited to, a metal or a metal alloy material (e.g., an aluminum alloy, a titanium alloy, etc.). The panel material for the secondary sheet 106 may be the same as or different than the panel material for the primary sheet 104.

Figure 9:
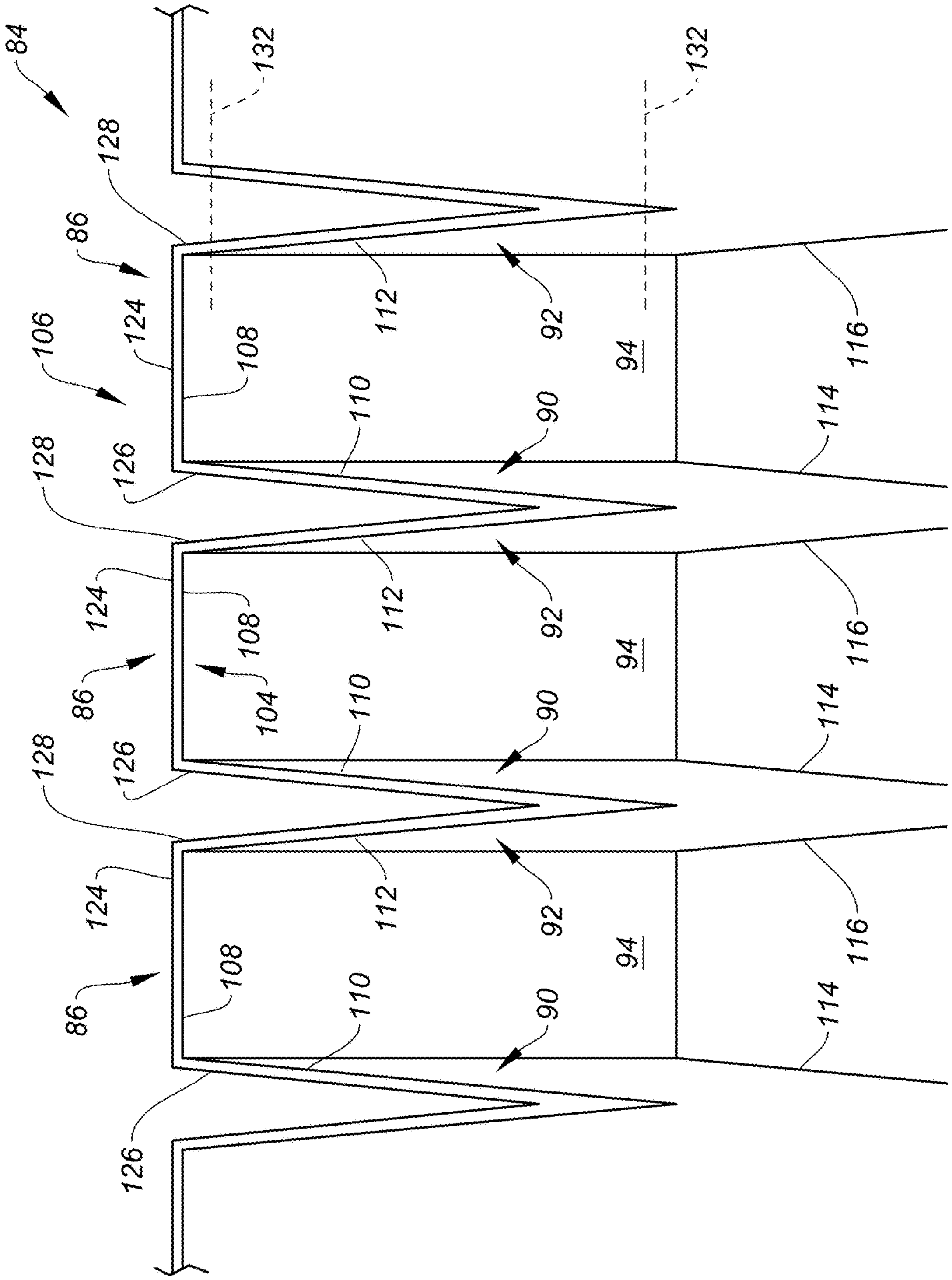
FIG. 9 illustrates a cutaway view of the primary sheet of FIG. 7 and the secondary sheet of FIG. 8 assembled together, in accordance with one or more embodiments of the present disclosure.

Referring to FIG. 9, one of the primary sheets 104 and one of the secondary sheets 106 are assembled together to form one of the cell rows 84. FIG. 9 illustrates a top, cutaway view of one of the primary sheets 104 and one of the secondary sheets 106 assembled together. The primary sheet 104 of FIG. 9 is positioned adjacent (e.g., transversely adjacent) the secondary sheet 106 of FIG. 9 such that each transverse panel portion 108 is disposed at (e.g., on, adjacent, or proximate) a respective transverse panel portion 124 to form the first transverse panel 86, each first longitudinal panel portion 110 is disposed at (e.g., on, adjacent, or proximate) a respective first longitudinal panel portion 126 to form the first longitudinal panel 90, and each second longitudinal panel portion 112 is disposed at (e.g., on, adjacent, or proximate) a respective second longitudinal panel portion 128 to form the second longitudinal panel 92. The first longitudinal panel 90 may additionally include the first attachment tab 114 and the second longitudinal panel 92 may additionally include the second attachment tab 116 (see FIG. 7). The tang lengths TL of the first attachment tab 114 and the second attachment tab 116 may be less than lengths of the first longitudinal panel portion 126 and the second longitudinal panel portion 128 (e.g., in the transverse direction) to facilitate suitable fit-up between the primary sheets 104 and the secondary sheets 106. The apertures 100 formed by the transverse panel portion 108 may be aligned with the respective holes formed by the transverse panel portion 124. Each of the primary sheets 104 may be attached (e.g., welded, brazed, bonded, or otherwise attached) to a respective one of the secondary sheets 106 to form one of the cell rows 84. For example, the first longitudinal panel 90 (e.g., the first longitudinal panel portions 110, 126 and the first attachment tab 114) for each of the cells 82 may be welded to the second longitudinal panel 92 (e.g., the second longitudinal panel portions 112, 128 and the second attachment tab 116) of an adjacent one of the cells at one or more weld points 132 (e.g., spot weld points). Of course, the present disclosure is not limited to the exemplary weld point 132 locations or quantity illustrated in FIG. 9. The first attachment tab 114 and the second attachment tab 116 for each of the cells 82 of one of the cell rows 84 may be attached (e.g., welded, brazed, bonded, or otherwise attached) to respective cells 82 of a transversely adjacent one of the cell rows 84 to form the acoustic core 56A (see FIG. 4).

The combination of the primary sheets 104 and the secondary sheets 106 to form the cell rows 84 of the acoustic core 56A, as previously discussed, facilitates greater density and thermal conductivity of the acoustic core 56A while also facilitating ease of manufacture and targeted acoustic frequency attenuation.

Figure 11:
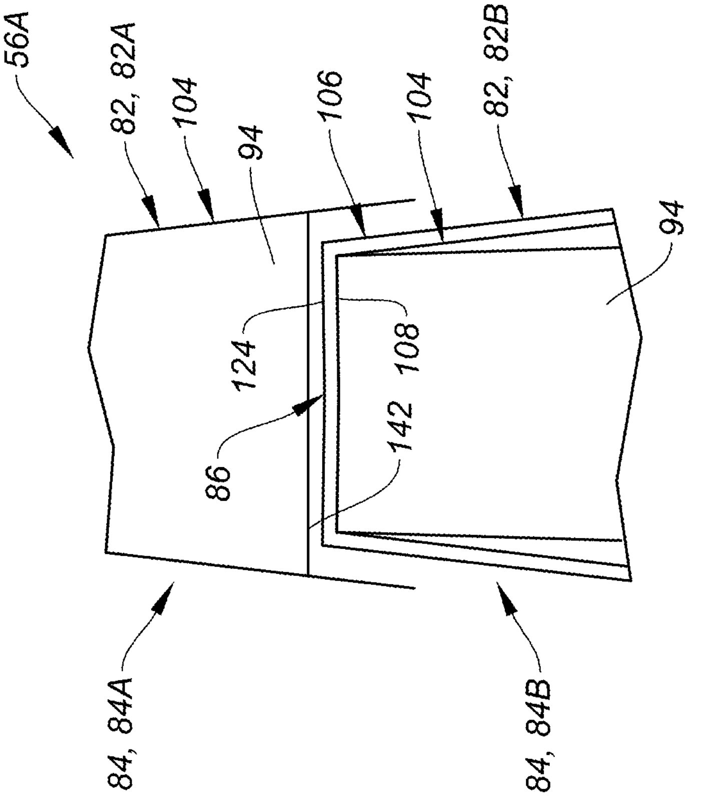
FIG. 11 illustrates a cutaway view of a portion of an acoustic core including the primary sheet and the secondary sheet of FIG. 10, in accordance with one or more embodiments of the present disclosure.
Figure 10:
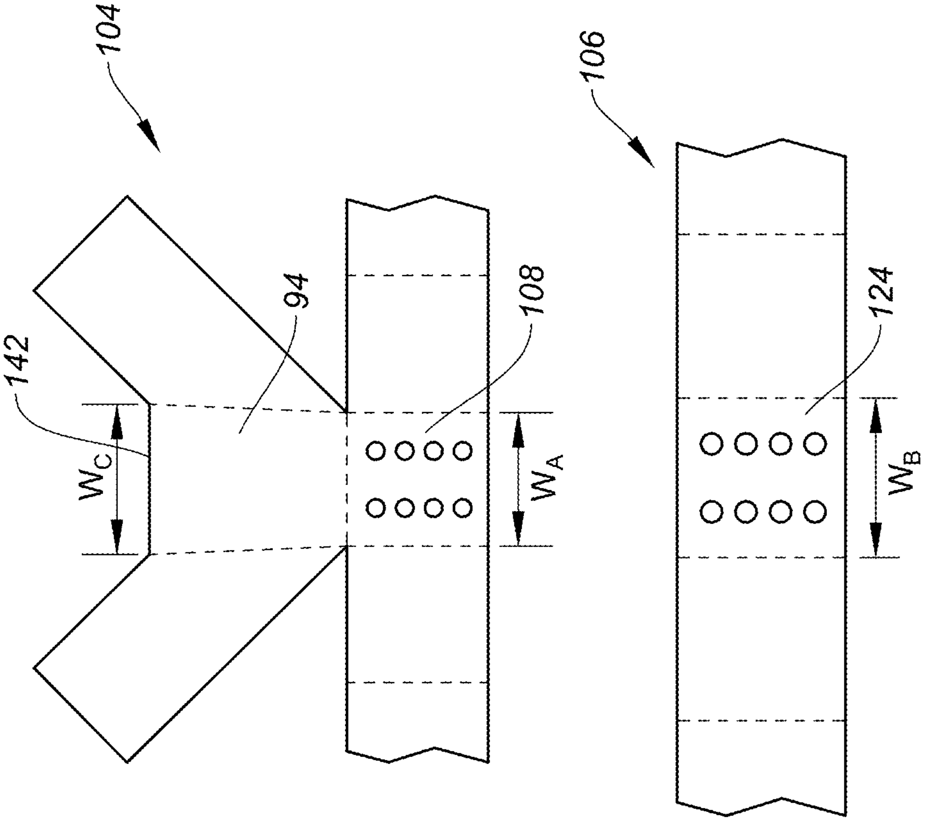
FIG. 10 illustrates another primary sheet and another secondary sheet for an acoustic core, in accordance with one or more embodiments of the present disclosure.

Referring to FIGS. 10 and 11, an exemplary configuration of the primary sheet 104 and the secondary sheet 106 is illustrated. FIG. 10 illustrates a portion of the primary sheet 104 and a portion of the secondary sheet 106 in an unfolded condition. FIG. 11 illustrates a portion of the acoustic core 56A showing portions of a first cell 82A of a first cell row 84A and portions of a second cell 82B of a second cell row 84B.

The transverse panel portion 108 of the primary sheet 104 of FIG. 10 has a first width $W_A$, for example, in the longitudinal direction (see FIG. 4). The transverse panel portion 124 of the secondary sheet 106 of FIG. 10 has a second width $W_B$, for example, in the longitudinal direction. The oblique panel 94 of the primary sheet 104 of FIG. 10 has a third width $W_C$, for example, in the longitudinal direction, at (e.g., on, adjacent, or proximate) a distal end 142 of the oblique panel 94, which distal end 142 may be disposed at (e.g., on, adjacent, or proximate) the inner side 76 with the acoustic core 56A in an assembled condition (see FIG. 4). Accordingly, the oblique panel 94 may have a trapezoidal shape as shown, for example, in FIG. 10. As shown in FIG. 10, the second width $W_B$ is greater than the first width $W_A$ and the third width $W_C$ is greater than the second width $W_B$ (i.e., $W_A<W_B<W_C$).

With the acoustic core 56A assembled, each cell 82 of each cell row 84 may be positioned transversely adjacent and/or attached to a respective cell 82 of an adjacent one of the cell rows 84. As shown in FIG. 11, for example, the first cell 82A is positioned with the distal end 142 of the oblique panel 94 of the first cell 82A at (e.g., on, adjacent, or proximate) the first transverse panel 86 (e.g., the transverse panel portions 108, 124) formed by the primary sheet 104 and the secondary sheet 106 of the second cell 82B. The different values of the widths $W_A$, $W_B$, $W_C$, as described above, facilitates improved fit-up at the mating interface between the adjacent cells 82, 82A, 82B of adjacent cell rows 84, 84A, 84B. Accordingly, the likelihood of cell wall buckling, cell deformation, manufacturing difficulties, and/or other defects may be reduced, for example, in comparison to an acoustic core for which the values of the first width $W_A$, the second width $W_B$, and the third width We are the same or substantially the same.

Figure 13:
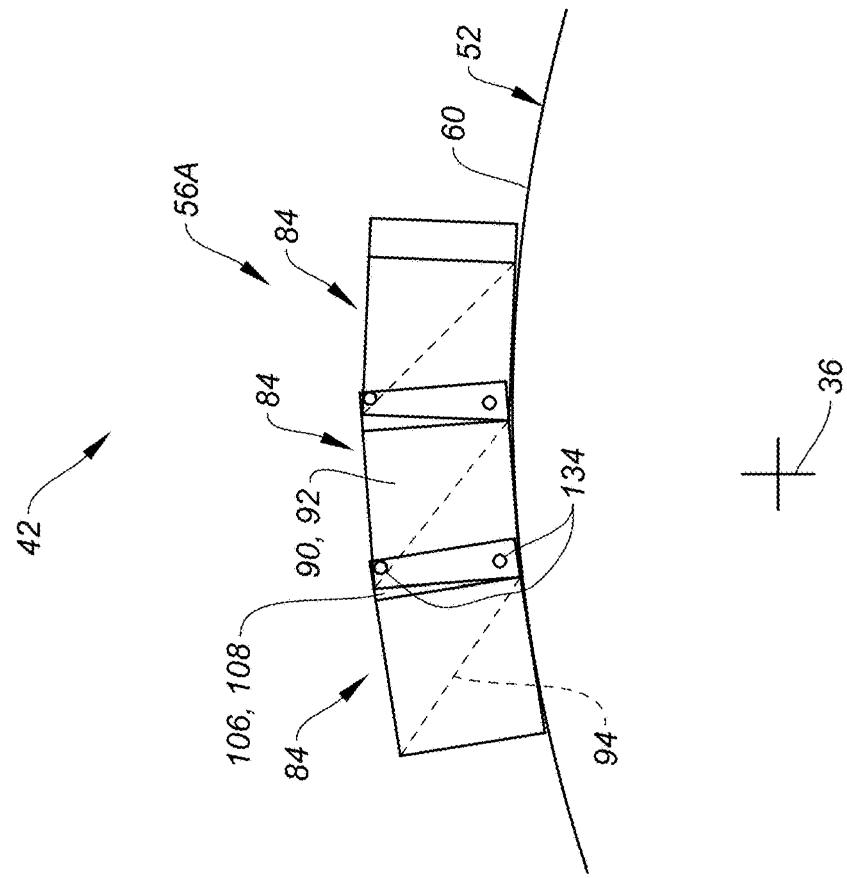
FIG. 13 illustrates a cutaway, side view of the acoustic core of FIG. 12 installed on an exhaust nozzle inner skin, in accordance with one or more embodiments of the present disclosure.
Figure 12:
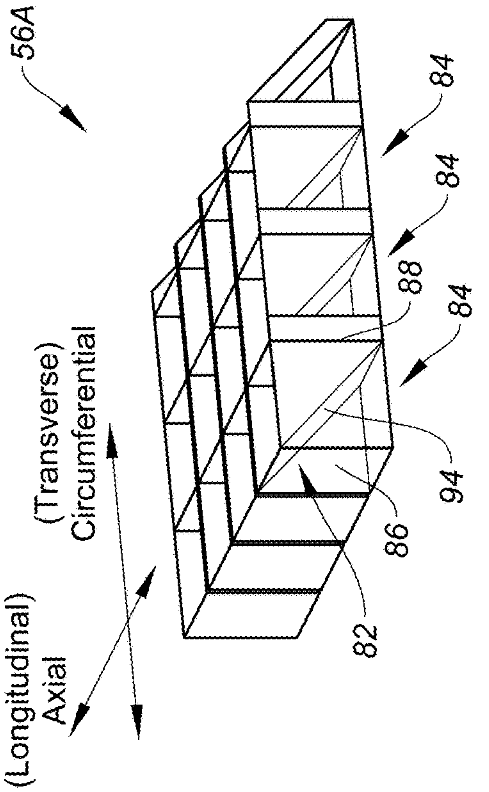
FIG. 12 illustrates a cutaway, perspective view of an acoustic core, in accordance with one or more embodiments of the present disclosure.

Referring to FIGS. 12 and 13, an exemplary configuration and orientation of the acoustic core 56A is illustrated for the exhaust nozzle 42. FIG. 12 illustrates a cutaway, perspective view of the acoustic core 56A. FIG. 13 illustrates a cutaway, side view of the acoustic core 56A on the inner skin 52. The acoustic core 56A of FIGS. 12 and 13 is disposed with the transverse direction of the acoustic core 56A oriented with the circumferential direction of the inner skin 52 (e.g., the transverse direction of the acoustic core 56A extends in the circumferential direction relative to the axial centerline 36). For example, each of the cell rows 84 may be positioned circumferentially adjacent one or more other cell rows 84 along the inner skin 52. The acoustic core 56A of FIGS. 12 and 13 is disposed with the longitudinal direction of the acoustic core 56A oriented with the axial direction of the inner skin 52 (e.g., the longitudinal direction of the acoustic core 56A extends in the axial direction relative to the axial centerline 36). For example, each of the cell rows 84 may extend axially or substantially axially along the inner skin 52. The oblique panel 94 for each of the cells 82 may, therefore, extend in the circumferential direction (and the radial direction) between and to the first transverse panel 86 and the second transverse panel 88. The oblique panel 94 for each of the cells 82 may extend in a clockwise or counter-clockwise direction from the first transverse panel 86 to the second transverse panel 88 as shown, for example, in FIG. 13.

The configuration and orientation of the acoustic core 56A relative to the exhaust nozzle 42 (e.g., the inner skin 52) may facilitate installation and mounting of the acoustic core 56A onto the inner skin 52. For installing the acoustic core 56A onto the inner skin 52, each of the cell rows 84 may positioned at (e.g., on, adjacent, or proximate) the inner skin 52 (e.g., the outer side 60). For example, each of the cell rows 84 may be disposed on the inner skin 52 circumferentially adjacent one or more other cell rows 84, with each of the cell rows 84 extending in the axial direction or substantially axial direction as shown, for example, in FIGS. 12 and 13. Once the cell rows 84 have been disposed on the inner skin 52, each of the cell rows 84 may be mounted or otherwise attached to one or more circumferentially adjacent cell rows 84. For example, the first attachment tab 114 and the second attachment tab 116 for each of the cells 82 may be mounted to or otherwise attached to the first longitudinal panel 90 and the second longitudinal panel 92, respectively, for one of the cells 82 of a circumferentially adjacent one of the cell rows 84. As shown in FIG. 13, for example, the first attachment tab 114 and the second attachment tab 116 may be welded (e.g., spot welded) to the first longitudinal panel 90 and the second longitudinal panel 92, respectively, for one of the cells 82 of a circumferentially adjacent one of the cell rows 84 at one or more weld points 134. The present disclosure, however, is not limited to the use of welding for attaching circumferentially adjacent cell rows 84, and the circumferentially adjacent cell rows 84 may alternatively be mounted or otherwise attached to one another using mechanical fasteners, adhesives, braze joints, or the like.

The arrangement of adjacent cell rows 84 in the circumferential direction along the inner skin 52 (e.g., the outer side 60) facilitates installation of the acoustic core 56A on the inner skin 52 to match the curvature of the inner skin 52. Attachment of the circumferentially adjacent cell rows 84 to one another subsequent to disposing the cell rows 84 on the inner skin 52 facilitates retention of the acoustic core 56A with the inner skin 52 curvature. The configuration and installation of the acoustic core 56A, as shown in FIGS. 12 and 13 and described above, facilitates a reduction in stress at attachment points (e.g., the weld points 134) between adjacent cell rows 84, for example, in comparison to an acoustic core for which cell rows may be mounted or otherwise assembled together prior to installation onto a curved surface. The configuration and installation of the acoustic core 56A, as shown in FIGS. 12 and 13 and described above, may also facilitate a reduction in stress at attachment points e.g., the weld points 134) between adjacent cell rows 84 as a result of thermal transients which may be experienced by the acoustic core 56A during operation of the gas turbine engine 22 (see FIG. 1).

Figure 14:
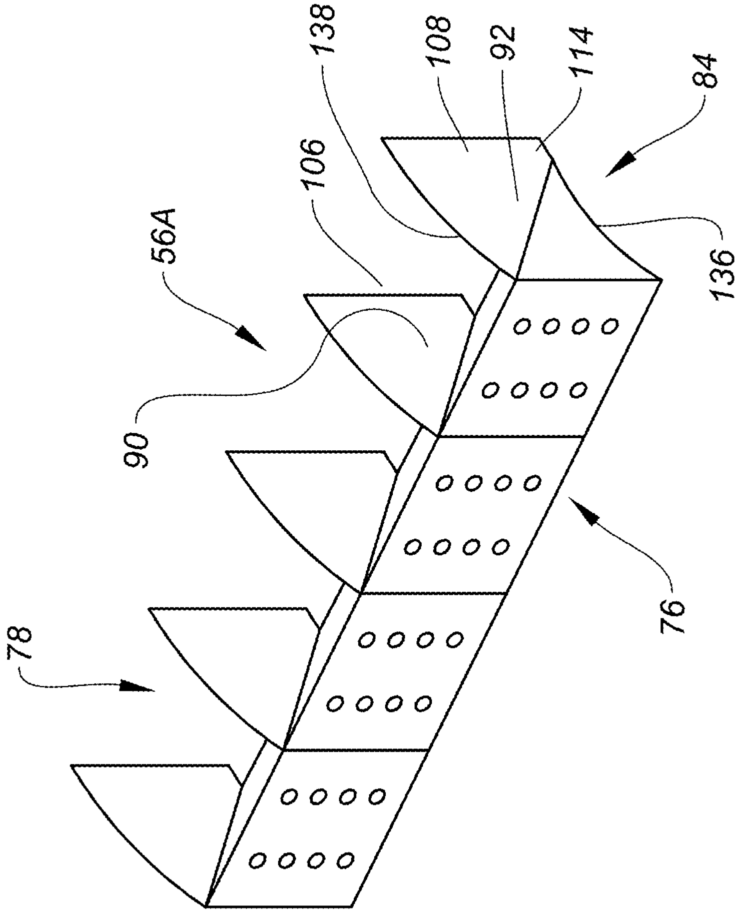
FIG. 14 illustrates a cutaway, perspective view of an acoustic panel, in accordance with one or more embodiments of the present disclosure.

Referring to FIG. 14, another exemplary configuration of the acoustic core 56A is illustrated. FIG. 14 illustrates a cutaway, perspective view of one of the cell rows 84 for the acoustic core 56A. As shown in FIG. 14, one or more of the cell rows 84 (e.g., the primary sheet 104 and the secondary sheet 106) may be cut or otherwise formed such that each of the first longitudinal panel 90, the second longitudinal panel 92, the first attachment tab 114, and the second attachment tab 116 forms a curved surface 136 at (e.g., on, adjacent, or proximate) the inner side 76. The curved surface 136 may be a concave surface having a curvature which matches a curvature of the inner skin 52 in the circumferential direction relative to the axial centerline 36 (see FIGS. 3 and 13). The present disclosure, however, is not limited to a concave curvature of the curved surface 136. The cell rows 84 may additionally be cut or otherwise formed such that each of the first longitudinal panel 90, the second longitudinal panel 92, the first attachment tab 114, and the second attachment tab 116 forms a curved surface 138 at (e.g., on, adjacent, or proximate) the outer side 78. The curved surface 138 may be a convex surface having a curvature which matches a curvature of the inner skin 52 in the circumferential direction relative to the axial centerline 36. The present disclosure, however, is not limited to a convex curvature of the curved surface 138.

The acoustic core 56A may be mounted or otherwise attached to the inner skin 52 (e.g., the outer side 60; see FIGS. 3 and 9). The first longitudinal panel 90, the second longitudinal panel 92, the first attachment tab 114, and/or the second attachment tab 116 may be mounted or otherwise attached to the inner skin 52 at (e.g., on, adjacent, or proximate) the inner side 76. For example, the first longitudinal panel 90, the second longitudinal panel 92, the first attachment tab 114, and/or the second attachment tab 116 may be brazed to the inner skin 52 at (e.g., on, adjacent, or proximate) the inner side 76. For an acoustic core which is flat at the inner side, the acoustic core may form one or more gaps (e.g., a radial gaps) between the inner side of the acoustic core mounted to a curved surface. At some positions of the acoustic panel, a size of the gap may exceed a tolerance (e.g., greater than about 0.0254 millimeters (mm)) for achieving a suitable braze joint between the acoustic panel and the curved surface. The curved surface 136 may, therefore, facilitate a stronger attachment between the acoustic core 56A and the inner skin 52 by eliminating or reducing a size of gaps between the acoustic core 56A at the inner side 76 and the inner skin 52 at the outer side 60.

Figure 15:
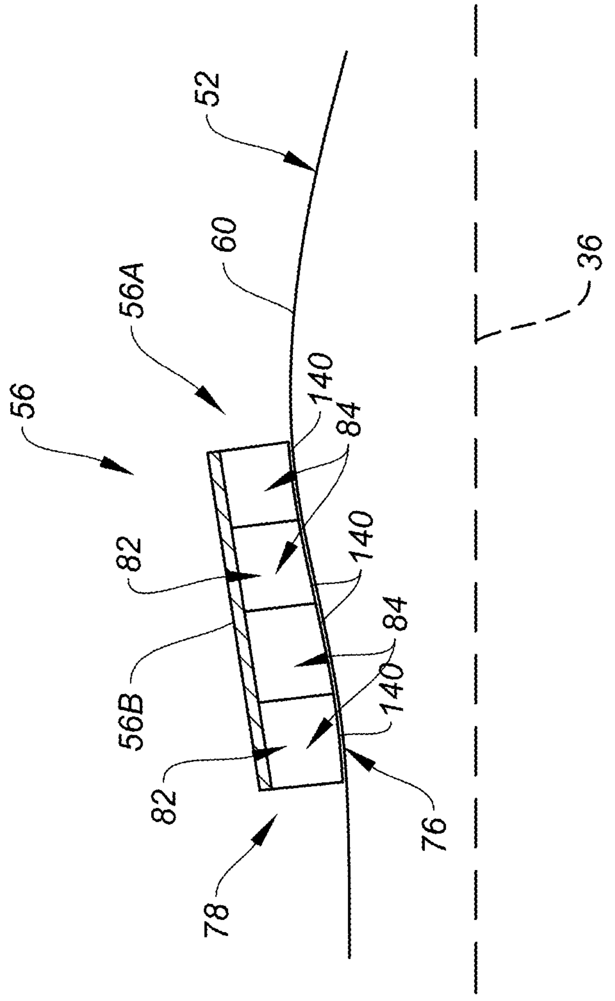
FIG. 15 illustrates a cutaway, perspective view of an acoustic panel, in accordance with one or more embodiments of the present disclosure.

Referring to FIG. 15, another exemplary configuration of the acoustic core 56A is illustrated. FIG. 15 illustrates a cutaway, side view of one of the cell rows 84 for the acoustic core 56A. As shown in FIG. 15, one or more of the cell rows 84 may be cut or otherwise formed such that the first transverse panel 86 and the oblique panel 94 may form a mating surface 140 at (e.g., on, adjacent, or proximate) the inner side 76. The mating surface 140 may be straight, curved (e.g., having concave and/or convex curvatures), or combinations thereof, such that the mating surface 140 matches a curvature of the inner skin 52 in the axial direction relative to the axial centerline 36. As shown in FIG. 15, a curvature or other shape of the inner skin 52 may vary in the axial direction. The mating surface 140 of the first transverse panel 86 and the oblique panel 94 for each of the cells 82 of the cell rows 84 may be cut to match the shape of an axial portion of the inner skin 52 (e.g., the outer side 60). For example, as shown in FIG. 15, a shape (e.g., a curvature) of the mating surface 140 for one of the cells 82 of the cell row 84 may be different than for one, more than one, or each of the other cells 82 of the cell row 84. The mating surface 140 of the first transverse panel 86 and the oblique panel 94 for each of the cells 82 of the cell rows 84 may also be cut such that the outer side 78 of the acoustic core 56A forms a linear or substantially linear surface in the axial direction as shown, for example, in FIG. 15, such that the acoustic core 56A forms a conical or cylindrical outer side 78.

The acoustic core 56A may be mounted or otherwise attached to the inner skin 52 (e.g., the outer side 60). The first transverse panel 86 and/or the oblique panel 94 may be mounted or otherwise attached to the inner skin 52 at (e.g., on, adjacent, or proximate) the inner side 76. For example, the first transverse panel 86 and/or the oblique panel 94 may be brazed to the inner skin 52 at (e.g., on, adjacent, or proximate) the inner side 76. For an acoustic core which is flat at the inner side, the acoustic core may form one or more gaps (e.g., a radial gaps) between the inner side of the acoustic core mounted to a curved surface. At some positions of the acoustic panel, a size of the gap may exceed a tolerance (e.g., greater than about 0.0254 millimeters (mm)) for achieving a suitable braze joint between the acoustic panel and the curved surface. The mating surface 140, as described above, may facilitate a stronger attachment between the acoustic core 56A and the inner skin 52 by eliminating or reducing a size of gaps between the acoustic core 56A at the inner side 76 and the inner skin 52 at the outer side 60. Moreover, by shaping the mating surface 140 for each of the cells 82 of the cell rows 84 to form a linear or substantially linear surface of the outer side 78 in the axial direction, the acoustic core 56A facilitates the use of a conical or cylindrical back skin 56B, thereby improving acoustic panel 56 strength and reducing acoustic panel 56 manufacturing cost by simplifying acoustic panel 56 component manufacturing and assembly and improving attachment quality and consistency between the acoustic core 56A and the back skin 56B.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An acoustic panel assembly for an aircraft propulsion system, the acoustic panel assembly comprising:

an acoustic panel including an acoustic core arranged along a transverse direction and a longitudinal direction, the acoustic core extends between and to an inner core side and an outer core side, the acoustic core includes a plurality of cell rows distributed transversely along the acoustic core, each cell row of the plurality of cell rows includes a plurality of cells distributed longitudinally along the respective cell row of the plurality of cell rows, each cell of the plurality of cells includes a first transverse panel, a second transverse panel, a first longitudinal panel, a second longitudinal panel, and an oblique panel extending between the inner core side and the outer core side, the first longitudinal panel and the second longitudinal panel extend between and to the first transverse panel and the second transverse panel, and the oblique panel extends between and to the first transverse panel at the outer core side and the second transverse panel at the inner core side; and each cell row of the plurality of cell rows includes a primary folded sheet and a secondary folded sheet, and each of the primary folded sheet and the secondary folded sheet forms the first transverse panel, the first longitudinal panel, and the second longitudinal panel for each cell of the plurality of cells;

wherein the primary folded sheet includes, for each cell of the plurality of cells, a primary transverse panel portion, a primary first longitudinal panel portion, a primary secondary longitudinal panel portion, and the oblique panel; and wherein the primary folded sheet further includes, for each cell of the plurality of cells, a first attachment tab at the primary first longitudinal panel portion and a second attachment tab at the primary second longitudinal panel portion, and each of the first attachment tab and the second attachment tab is attached to an adjacent cell row of the plurality of cell rows.

2. The acoustic panel assembly of claim 1, wherein the secondary folded sheet includes, for each cell of the plurality of cells, a secondary transverse panel portion disposed at the primary transverse panel portion to form the first transverse panel, a secondary first longitudinal panel portion disposed at the primary first longitudinal panel portion to form the first longitudinal panel, and a secondary second longitudinal panel portion disposed at the primary second longitudinal panel portion to form the second longitudinal panel.

3. The acoustic panel assembly of claim 2, wherein the primary transverse panel portion has a first width in the longitudinal direction, the secondary transverse panel portion has a second width in the longitudinal direction, the oblique panel has a third width in the longitudinal direction at the inner core side, and the second width is greater than the first width and the third width is greater than the second width.

4. The acoustic panel assembly of claim 2, wherein, for each cell of the plurality of cells, the primary first longitudinal panel portion is attached to the secondary first longitudinal panel portion at one or more first weld points and the primary second longitudinal panel portion is attached to the secondary second longitudinal panel portion at one or more second weld points.

5. The acoustic panel assembly of claim 1, wherein each cell of the plurality of cells has a cell width in the longitudinal direction, each of the first attachment tab and the second attachment tab has a tang length, and the tang length is greater than the width.

6. The acoustic panel assembly of claim 1, wherein, for each cell of the plurality of cells, the oblique panel forms and separates an inner cavity and an outer cavity of each respective cell of the plurality of cells, the inner cavity is disposed at the inner core side, and the outer cavity is disposed at the outer core side.

7. The acoustic panel assembly of claim 6, wherein the inner cavity of a first cell of the plurality of cells of a first cell row of the plurality of cell rows is connected in fluid communication with a second cell of the plurality of cells of a second cell row of the plurality of cell rows, and the first cell row is transversely adjacent the second cell row.

8. The acoustic panel assembly of claim 1, wherein the first transverse panel includes a plurality of apertures, and each of the primary folded sheet and the secondary folded sheet forms the plurality of apertures.

9. A method for forming an acoustic panel assembly for an aircraft propulsion system, the method comprising:

forming a plurality of cell rows of an acoustic core by, for each cell row of the plurality of cell rows, folding and assembling a primary sheet and a secondary sheet to form each cell row with a plurality of cells, and each cell of the plurality of cells includes a first transverse panel, a first longitudinal panel, a second longitudinal panel, a first attachment tab, and an oblique panel extending between an inner core side of the acoustic core and an outer core side of the acoustic core, each of the primary sheet and the secondary sheet forms the first transverse panel, the first longitudinal panel, and the second longitudinal panel, the first longitudinal panel and the second longitudinal panel extend transversely from the first transverse panel, and the oblique panel extends transversely between and to the first transverse panel at the outer core side and the inner core side; and attaching the first attachment tab of each cell row of the plurality of cell rows to a respective first attachment tab of at least one other cell row of the plurality of cell rows to form the acoustic core.

10. The method of claim 9, wherein forming the plurality of cell rows includes, for each cell of the plurality of cells, welding the primary sheet to the secondary sheet at the first longitudinal panel and the second longitudinal panel.

11. The method of claim 9, wherein attaching each cell row of the plurality of cell rows to at least one other cell row of the plurality of cell rows includes welding the first attachment tab each cell row of the plurality of cell rows to the respective first attachment tab of the at least one other cell row of the plurality of cell rows.

12. The method of claim 9, wherein folding the primary folded sheet forms, for each cell of the plurality of cells, a primary transverse panel portion of the first transverse panel, a primary first longitudinal panel portion of the first longitudinal panel, a primary secondary longitudinal panel portion of the second longitudinal panel, and the oblique panel.

13. The method of claim 12, wherein folding the secondary folded sheet forms, for each cell of the plurality of cells, a secondary transverse panel portion of the first transverse panel, a secondary first longitudinal panel portion of the first longitudinal panel, and a secondary second longitudinal panel portion of the second longitudinal panel.

14. An acoustic panel assembly for an aircraft propulsion system, the acoustic panel assembly comprising:

an inner skin extending circumferentially about an axial centerline, the inner skin extends between and to an inner skin side and an outer skin side, and the inner skin includes a perforated skin portion; and an acoustic panel including an acoustic core disposed on the outer skin side at the perforated skin portion, the acoustic core is arranged along a transverse direction and a longitudinal direction, the acoustic core includes a plurality of cell rows distributed transversely along the acoustic core, each cell row of the plurality of cell rows includes a plurality of cells distributed longitudinally along the respective cell row of the plurality of cell rows, each cell of the plurality of cells includes a first transverse panel, a second transverse panel, a first longitudinal panel, and a second longitudinal panel, the first longitudinal panel and the second longitudinal panel extend between and to the first transverse panel and the second transverse panel; and at least one cell row of the plurality of cell rows includes a primary folded sheet and a secondary folded sheet, the primary folded sheet includes, for each cell of the plurality of cells, a primary transverse panel portion, a primary first longitudinal panel portion, and a primary secondary longitudinal panel portion, and the secondary folded sheet includes, for each cell of the plurality of cells, a secondary transverse panel portion disposed on the primary transverse panel portion to form the first transverse panel, a secondary first longitudinal panel portion disposed on the primary first longitudinal panel portion to form the first longitudinal panel, and a secondary second longitudinal panel portion disposed on the primary second longitudinal panel portion to form the second longitudinal panel;

wherein the primary folded sheet further includes, for each cell of the plurality of cells, a first attachment tab at the primary first longitudinal panel portion and a second attachment tab at the primary second longitudinal panel portion, and each of the first attachment tab and the second attachment tab is attached to an adjacent cell row of the plurality of cell rows.

15. The acoustic panel assembly of claim 14, wherein each cell of the plurality of cells has a cell width in the longitudinal direction, each of the first attachment tab and the second attachment tab has a tang length, and the tang length is greater than the width.

16. The acoustic panel assembly of claim 14, wherein the primary folded sheet further includes, for each cell of the plurality of cells, an oblique panel extending transversely and radially between and to the first transverse panel and the second transverse panel, and the oblique panel forms and separates an inner cavity and an outer cavity of each respective cell of the plurality of cells.

17. The acoustic panel assembly of claim 16, wherein the inner cavity is disposed at the perforated skin portion.

* * * * *